United States Patent [19]

Luthardt

[11] 4,016,312

[45] Apr. 5, 1977

[54] METHOD OF COATING A CELLULOSIC SUBSTRATE WITH AN ADHERENT POLYMERIC COATING

[75] Inventor: Hans J. Luthardt, Voorhout, Netherlands

[73] Assignee: Akzo N.V., Arnhem, Netherlands

[22] Filed: May 28, 1975

[21] Appl. No.: 581,583

[30] Foreign Application Priority Data

May 30, 1974 Netherlands .................... 7407256

[52] U.S. Cl. .............................. 427/303; 427/333; 427/341; 427/342

[51] Int. Cl.$^2$ .................... B05D 3/10; B05D 7/06; B05D 1/36

[58] Field of Search .......... 427/302, 303, 333, 340, 427/341, 342, 390 R, 324, 393, 325; 260/873, 29.2 E; 428/481, 514

[56] References Cited

UNITED STATES PATENTS

| | | | |
|---|---|---|---|
| 2,098,540 | 11/1937 | Church et al. | 428/481 |
| 2,805,962 | 9/1957 | Hendricks | 427/342 |
| 2,865,874 | 12/1958 | Christenson | 428/514 |
| 2,934,509 | 4/1960 | Crissey | 260/873 |
| 3,075,936 | 1/1963 | Bolton | 260/873 |
| 3,461,186 | 8/1969 | Galiano | 428/514 |
| 3,536,518 | 10/1970 | Drelich | 427/324 |
| 3,809,573 | 5/1974 | Feitlowitz | 427/390 R |
| 3,849,173 | 11/1974 | Drelich et al. | 427/303 |
| 3,900,620 | 8/1975 | Gilman et al. | 427/325 |
| 3,930,074 | 12/1975 | Drelich et al. | 427/303 |

FOREIGN PATENTS OR APPLICATIONS

681,279   3/1964   Canada ............................ 260/873

*Primary Examiner*—James R. Hoffman
*Attorney, Agent, or Firm*—Stevens, Davis, Miller & Mosher

[57] ABSTRACT

A cellulosic substrate is provided with an adherent polymeric coating by wetting the substrate first with a coagulant for the polymer to be used, contacting the resulting coating with an aqueous dispersion of an oxidatively drying binder and a polymer of an ethylenically unsaturated ester.

4 Claims, No Drawings

METHOD OF COATING A CELLULOSIC SUBSTRATE WITH AN ADHERENT POLYMERIC COATING

This invention relates to a method of covering a substrate with an adherent coating of a film-forming polymer by first applying to the substrate a coating of a coagulant for a film-forming polymer, subsequently bringing the coating on the substrate into contact with an aqueous dispersion of a film-forming polymer which will be coagulated by the coagulant coating, and drying the wet polymer coating.

A method of the general type indicated above is disclosed in Netherlands Patent Specification No. 7,017,216. In this patent specification, page 2, lines 4-11, a method of ionically applying as film-forming material a natural rubber latex is described. No mention is made there of the nature of the substrate. The method described in the patent specification actually comprises coating a metal object in such a way that no separate coagulant is employed and the dispersion of the film-forming polymer is made to contain an oxidizing acid system by which metal ions are deposited on the surface of the metal object. Such a method cannot be employed for coating a non-metallic object because for such substrate a separate coagulant is required. In that case, however, it appears that applying a randomly chosen dispersion of a film-forming polymer to a substrate which consists entirely or partly of cellulose results in obtaining a coating with insufficient hiding power and adhesion.

It is therefore an object of this invention to provide a method for coating a substrate with a film of polymer having good adhesion to the substrate.

It has now been found that by the method according to the present invention excellent adhesion between the coating and the substrate can be obtained. Thus, it is possible to obtain on wood a good coating of paint which shows excellent adhesion and hiding power, the hiding power at sharp edges and corners being considerably better than can be obtained with the usual coating compositions and methods. Further advantages will be discussed hereinafter.

The foregoing objects and others are accomplished in accordance with the invention by providing a method wherein a substrate which is entirely or partially cellulose is coated with an aqueous polymer dispersion made up of an oxidatively drying binder and a polymer of an ethylenically unsaturated ester in a weight ratio in the range of 10:90 to 50:50.

In a first step a coating of coagulant for the film-forming polymer is applied to the substrate. This can be done in any suitable manner by bringing the substrate into contact with the coagulant, for instance, by rolling, spraying, brushing, flow coating or dipping, whicy may be carried out under pressure, if desired. The coagulant is often used in the form of an aqueous solution or dispersion and/or an organic solvent having a concentration generally between at least 1% and the saturation point, preferably between 5 and 20%.

Any suitable inorganic acid, or organic acid whose negative logarithm (p $K_a$) of the dissociation constant is less than 7 or salt thereof soluble in water and/or in an organic solvent may be used as the coagulant. Examples of suitable acids are hydrochloric acid, phosphoric acid, sulphuric acid, nitric acid, formic acid, acetic acid, propionic acid, p-tolylene sulphonic acid and the like. It is preferred to use salts which contain monovalent, bivalent or multivalent cations, for instance, $K^+-$, $Sr^{2+}-$, $Ca^{2+}-$, $Mg^{2+}-$, $Be^{2+}-$, $Zn^{2+}-$, $B^{3+}-$, $Al^{3+}-$, $Ga^{3+}-$, $Ti^{4+}-$, $Zr^{4+}-$, $Pb^{2+}-$ or ammonium salts. It is more particularly preferred to use cations chosen from the second, the third and the fourth groups of the Periodic Table of Mendeleeff. If desired, use may be made of salts with wood-preserving properties, which protect the wood from wood-attacking or wood-discoloring fungi or insects. Mixtures of the above-mentioned coagulants, in combination, if desired, with non-saline wood-preserving agents, are also applicable. The temperature of the coagulant is generally within the range of about 0° to 90° C., and preferably between +10° and +30° C. when it is applied to the substrate. After the substrate has been treated with the coagulant, the substrate is usually at least partially dried to prevent some of the coagulant from getting into the aqueous dispersion of the film-forming polymer.

In a second step, the substrate treated with the coagulant is brought into contact with an aqueous dispersion of a film-forming polymer. This can be done in any suitable manner, for instance, by immersion in a bath containing the dispersion. The temperature of the bath is preferably within the range of 0° to about 90° C. and most preferably between +10° and +50° C.

Depending on the amount of coagulant previously deposited on the substrate, the thickness of the coating of film-forming polymer on the substrate (after drying) will in practice generally be between 40 and 200 $\mu$, and preferably between 50 and 160 $\mu$. Subsequently, the material is dried in the usual manner, for instance, at room temperature for a few hours or at an elevated temperature, for example, 40° and 60° C., for 20 to 50 minutes. The substrate may, of course, be given several coats of the polymer. But in practice this will generally not be necessary because one coat has sufficient thickness, particularly at sharp edges and corners. In spite of the resulting great thickness of the coat, film formation and drying take a short time compared with the usual compositions.

According to the method of the invention use is made of a substrate which entirely or partly consists of cellulose, for instance, paper, wood, chipboard, board, cardboard, films or webs; by preference use is made of wood, fiberboard or chipboard. The substrates often have a porous character and form a base which can absorb at least some of the coagulant and the polymer dispersion.

A suitable binder which dries upon oxidation may be used according to the invention such as, for example, oxidatively drying alkyd resins with an oil length in the range of 25 to 70%, and preferably in the range of 60 to 68%, and oxidatively drying oils. It is preferred to use an oxidatively drying alkyd resin because of the short drying time. The oxidatively drying alkyd resin can be prepared in a known manner from a diol and/or a polyol and a di- and/or polycarboxylic acid, in the presence, if desired, of monoalcohols and/or monocarboxylic acids. Any suitable diol or polyol may be used, preferably diols or polyols containing 2 to 19 carbon atoms, such as, for example, ethylene glycol, propylene glycol, pentane diol, neopentyl glycol, hexane diol, 2,2,4- or 2,4,4-trimethylhexanediol 1–6, diethylene glycol, triethylene glycol, glycerol, trimethylol ethane, triemethylol propane, pentaerythritol, dipentaerythritol, sorbitol or the like. Examples of suitable monoalcohols, generally containing 3 to 8 carbon atoms, are butanol, hexanol or ethoxy ethanol and the like.

Any suitable dicarboxylic acid or polycarboxylic acid may be used, preferably acids containing 2 to 10 carbon atoms, such as, for example, succinic acid, adipic acid, azelaic acid, sebacic acid, furmaric acid, maleic acid, citric acid, phthalic acid, isophtalic acid, trimellitic acid and/or pyromellitic acid and, as the case may be, the corresponding anhydrides. Particularly suitable monocarboxylic acids are those containing 2 to 24 atoms, for instance, crotonic acid, caproic acid, capric acid, 2-ethylhexane carboxylic acid, lauric acid, linoleic acid, oleic acid, eruca acid, abietic acid, benzoic acid and p-tert.butyl benzoic acid. In the preparation of the oxidatively drying alkyd resin use may be made of a glyceride; for instance, castor oil, dehydrated castor oil, coconut oil, linseed oil, soybean oil or tung oil. Suitable oxidatively drying oils are, for example, unsaturated fatty acid esters of polyols, such as glycerol, trimethylol propane and pentaerythritol and allyl ethers of polyols.

The alkyd resin may be modified, if desired, with aromatic or aliphatic monoisocyanates or diisocyanates. This can be done, for instance, by replacing part of a monocarboxylic acid or dicarboxylic acid with the isocyanate to be used. Examples of suitable organic isocyanates are hexamethylene diisocyanate, 2,2-bis(4-isocyanato cyclohexyl)propane, bis(2-isocyanato ethyl)fumarate, bis(4-isocyanato cyclohexyl)methane, dimeryl diisocyanate, isophoron diisocyanate, 2,2,4- or 2,4,4-trimethyl-hexamethylene diisocyanate, benzene-1,4-diisocyanate and by preference tolylene diisocyanate.

The polymer of an ethylenically unsaturated ester, which according to the invention, is used as a second polymer component in the aqueous dispersion, may be made up of one or more acrylate esters and/or methacrylate esters and/or one or more vinyl esters.

The polymer contains at least 10%, and preferably 30–70% by weight of the ethylenically unsaturated ester or esters. Other monomers which may be included in the polymer, if desired, are styrene, vinyl chloride, vinylidene chloride, ethylene and crotonic acid. Any suitable vinyl ester may be used, such as, for example, vinyl acetate, vinyl propionate, vinyl versatate and vinyl laurate. Suitable acrylic or methacrylic esters are, for example, methyl acrylate, methyl meracrylate, butyl acrylate and 2-ethylhexyl acrylate.

The oxidatively drying binder and the polymer of the unsaturated ester may be combined in any suitable manner, for instance, by adding the oxidatively drying binder to an aqueous dispersion of the polymer of the unsaturated ester.

The aqueous dispersion of the film-forming polymer generally has a solids content in the range of about 40–60%.

It is preferred that the aqueous dispersion should be stabilized in a known manner with an anionic emulgator or emulsifying agent in combination, if desired, with a smaller proportion of a nonionic emulgator or emulsifying agent.

According to the invention the weight ratio between the oxidatively drying binder and the polymer of an ethylenically unsaturated ester is generally in the range of 10:90 to 50:50, and is preferably in the range of 30:70 to 45:55. It has been found that dispersions containing less than 10% by weight of the oxidatively drying binder (based on the total amount of polymer) result in poor adhesion between the polymer coating and the substrate and the dispersions containing more than 50% by weight of the binder lead to an undesirably long curing time of the polymer.

The aqueous dispersion of the film-forming polymer may contain usual additives; for instance, pigments; fillers; anti-foaming agents; dispersing agents; thickening agents; fungicides; cosolvents; siccatives such as metal naphthenates; basic compounds such as ammonia; and resins. Moreover, the aqueous polymer dispersion may contain organic solvents, for instance, toluene or xylene; these solvents may be added to the final polymer dispersion or to the separate dispersion or dispersions of the oxidatively drying binder and/or the polymer of the ethylenically unsaturated ester.

The method provided by the invention may be used to advantage for applying a thick coating of primer to a substrate, such as wood. Very little, if any, pretreatment of the substrate is required. For instance, it may be necessary only to sandpaper the surface before the coagulant is applied to it. After the film-forming polymer has been applied to the substrate as primer, the object may be given a finishing coat of any sort of paint or varnish desired. The coating applied to the substrate by the method provided by the invention has, for instance, good sandability, elasticity, outdoor durability and a high water-vapor permeability.

EXAMPLE I

Into a 25-liter vessel are successively charged at room temperature 162 parts by weight of a thickening agent (hydroxyl ethyl cellulose, 12% solution in water), 25 parts by weight of ethylene glycol, 1 part by weight of an anti-foaming agent (a silicone oil manufactured by Wacker Chemie, Germany) 6 parts by weight of a water-soluble wetting agent and 40 parts by weight of demineralized water, use being made of a Cowles dispersing apparatus set to a speed of 200–300 revolutions per minute. As soon as the mixture is homogeneous, 330 parts by weight of a mixture made up of titanium dioxide and chalk are added, with stirring. Subsequently, the speed of the dispersing apparatus is increased to 2000 r.p.m., and in 20 minutes a particle size of about 40 $\mu$ is attained, followed by cooling. Not until then are added, with stirring, 512 parts of a methylmethacrylate-butyl-acrylate-styrene-copolymer (20:30:50) emulsion with a solids content of 46% and a minimum film-forming temperature of 15° C., followed by adding 230 parts by weight of a fatty alkyd resin solution (70% in white spirit) containing a conventional siccative.

The resulting dispersion is diluted to a viscosity of 20 seconds (Din Cup 4 at 20° C.) with demineralized water.

A dipping paint dispersion prepared as described above and contained in a trough is kept circulating with the aid of a pump. A wooden window frame suspending from a conveyor belt is dipped for 20 seconds in a 10% solution of aluminum sulphate in water at room temperature.

After the water has been allowed to drip off, the window frame is partially dried with the aid of hot air and subsequently the wooden object thus treated is for a short time immersed in the bath containing the above-described dipping paint dispersion.

As soon as the entire surface has been wetted with paint, the object is taken out of the bath with a thick coating of dispersion being visible on the window frame. The coating is evenly distributed over the entire surface.

After three hours storage at room temperature the film is so dry that a thumb-pressure of one minute does not leave any marks. Drying for thirty minutes in a tunnel or stove with little air circulation at an air temperature of about 50° C. leads to the same results. The surface has a dull appearance and is not tacky.

The filling and the hiding power at sharp edges are excellent. The mean coating thickness of the dry film is 100–120 $\mu$. Its adhesion is excellent.

After accelerated aging for 90 hours at 50° C. the elasticity of the coating was still found to be very good. Dried at room temperature, the window frames coated in this way can be stacked about 6 to 8 hours after immersion. The dried coating can be readily rubbed with sandpaper 280 (silicone paper) and in the usual way a coating of an alkyd resin paint or other paint may be applied to it.

EXAMPLES 2–24

Example I is repeated, except that use is made of the compounds and conditions mentioned in Table 1. The covering of the edges varies from good to excellent.

polymer. In all cases, however, the adhesion of the polymer to the substrate was found to be very bad.

Although the invention has been described in detail for the purposes of illustration, it is to be understood that such detail is solely for that purpose and that those skilled in the art can make variations therein without departing from the spirit and scope of the invention except as it may be limited by the claims.

I claim:

1. The method of covering a substrate which is at least partly cellulose with an adherent coating of a film-forming polymer of an ethylenically unsaturated ester which comprises first applying to the substrate a coating of a coagulant for the polymer, subsequently contacting the thus coated substrate with an aqueous dispersion containing a binder which will dry upon oxidation and the film-forming polymer of an ethylenically unsaturated ester in a weight ratio in the range of 10:90 to 50:50 whereby the polymer coagulates on the surface of the substrate to form a coating and thereafter drying the thus formed coating.

2. The method of claim 1 wherein the substrate is wood, fiberboard or chipboard.

3. The method of claim 1 wherein the ratio of the

Table 1

| Example | Oxidatively drying binder (A) | Polymer of the unsaturated ester (B) | Weight ratio between A and B (solid/solid) | Coagulant composition | Conc. (%) | Coat thickness dry polymer on substrate ($\mu$) |
|---|---|---|---|---|---|---|
| 2 | Linseed fatty acid triglyceride | Polyvinyl acetate-acrylate copolymer (60:40) | 20:80 | $Al_2(SO_4)_3$ | 5 | 20–30 |
| 3 | " | " | " | " | 10 | 40–60 |
| 4 | " | " | " | $CaCl_2$ | 20 | 85–100 |
| 5 | Cotton seed oil trimethylol propane-phthalic anhydride alkyd resin | Polyvinyl acetate-acrylate copolymer 70:30) | " | $Al_2(SO_4)_3$ | 5 | 30–40 |
| 6 | " | " | " | " | 10 | 30–40 |
| 7 | " | " | " | $CaCl_2$ | 20 | 90–100 |
| 8 | " | Styrene-acrylate copolymer | 10:90 | $K_2SO_4$ | 5 | 250 |
| 9 | " | " | " | " | 20 | 520 |
| 10 | " | " | 20:80 | $CaCl_2$ | 10 | 130 |
| 11 | " | " | 40:60 | " | 10 | 120 |
| 12 | " | " | 20:80 | " | 10 | 140 |
| 13 | " | " | " | " | 20 | 130 |
| 14 | " | Acrylate copolymer | 40:60 | $Al_2(SO_4)_3$ | 10 | 90 |
| 15 | " | " | 20:80 | Pb-acetate | 10 | 85 |
| 16 | Trimethylol propane diallyl ether | Polyvinyl acetate-acrylate copolymer (50:50) | 20:80 | $Al_2(SO_4)_3$ | 5 | 20–40 |
| 17 | " | " | " | " | 10 | 40–50 |
| 18 | " | " | " | $CaCl_2$ | 20 | 100 |
| 19 | Trimethylol propane linoleic tri ester | Polyvinyl acetate-acrylate copolymer (20:80) | " | $Al_2(SO_4)_3$ | 5 | 10–30 |
| 20 | " | " | " | " | 10 | 50–60 |
| 21 | " | " | " | $CaCl_2$ | 20 | 100 |
| 22 | Pentaerythritol linoleic tetra ester | Polyvinyl acetate-acrylate copolymer (80:20) | " | $Al_2(SO_4)_3$ | 5 | 20–50 |
| 23 | " | " | " | " | 10 | 50–80 |
| 24 | " | " | " | $CaCl_2$ | 20 | 100 |
| 25 | Soya bean oil pentaerythritol phtalic anhydride alkyd resin | Acrylate copolymer | 40:60 | $Al_2(SO_4)_3$ | 10 | 100 |
| 26 | Safflower oil phtalic anhydride alkyd resin modified with tolylene diisocyanate | " | 40:60 | " | 10 | 120 |

For comparison Example I is repeated, except that use is made of an aqueous dispersion of, respectively, a polyurethane, polytetrafluoroethene, a polyacrylate, a copolymer of vinyl acetate and styrene and of a copolymer of ethylene and vinyl acetate as a film-forming binder and the polymer of an ethylenically unsaturated ester is within the weight ratio of 30:70 and 45:55.

4. The method of claim 1 wherein the binder is an alkyd resin.

* * * * *